US006580416B1

(12) United States Patent
Gardner

(10) Patent No.: US 6,580,416 B1
(45) Date of Patent: Jun. 17, 2003

(54) METHOD OF USING A POINTER AND A OPT-OUT PERIOD TO TELL AN ACTUATOR TO ACTUATE ITSELF

(75) Inventor: Timothy Elliott Gardner, Bronxville, NY (US)

(73) Assignee: CodeHorse, Inc., Bronxville, NY (US)

( * ) Notice: Subject to any disclaimer, the term of this patent is extended or adjusted under 35 U.S.C. 154(b) by 0 days.

(21) Appl. No.: 09/545,774

(22) Filed: Apr. 10, 2000

(51) Int. Cl.[7] ................................................ G09G 5/08
(52) U.S. Cl. ........................................ 345/157; 345/156
(58) Field of Search ................................ 345/156, 157, 345/160, 163, 173; 341/20, 21, 22

(56) References Cited

U.S. PATENT DOCUMENTS

| 5,436,637 | A | * | 7/1995 | Gayraud et al. | ............ | 345/116 |
| 5,754,178 | A | * | 5/1998 | Johnston et al. | ............ | 345/343 |
| 5,825,308 | A | * | 10/1998 | Rosenberg | .................... | 341/20 |
| 6,005,570 | A | * | 12/1999 | Gayraud et al. | ............ | 345/338 |
| 6,212,577 | B1 | * | 4/2001 | Stern et al. | .................. | 709/329 |
| 6,259,382 | B1 | * | 7/2001 | Rosenberg | .................... | 341/20 |
| 6,373,463 | B1 | * | 4/2002 | Beeks | ........................ | 345/156 |

* cited by examiner

Primary Examiner—Amare Mengistu

(57) ABSTRACT

An opt-out actuator for which actuation is cancelled if the operator changes his or her state within a prescribed amount of time. The operator is informed of "entering" the conditions for actuation by a first sensory means. After an optional grace period to lower the incidence of accidentally and temporarily meeting these conditions, the operator is informed of the "cocking" of the actuator by a second sensory means. The operator then has a longer period in which to opt-out of the actuator by changing his or her state. If the operator does not opt out by changing state, the actuator fires and the operator is informed by a third sensory means. If the operator opts out, the operator is informed of this "canceling" by a fourth sensory means which could be the reversion of continuous sensory feedback to its state prior to the triggering of the actuator and which serves as confirmation to the operator that actuation has been cancelled.

10 Claims, 1 Drawing Sheet

Flow Chart for Opt-Out Actuator

METHOD OF USING A POINTER AND A OPT-OUT PERIOD TO TELL AN ACTUATOR TO ACTUATE ITSELF

CROSS-REFERENCE TO RELATED APPLICATIONS:

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to actuators which are triggered directly by an intelligent operator and for which the decision to actuate is a choice of the operator.

Most such actuators require a well-defined physical action on the part of the operator to initiate actuation. Traditional wall-mount light switches work by an operator physically moving a lever to one position or another thereby connecting or disconnecting a circuit, and software based actuators have traditionally attempted to model the experience of the traditional actuators.

Most software based actuators triggered by pointing devices work as follows:

1. An actuator region exists on the screen. Example: an underlined link on an html page or a submit button on that same page.
2. The operator positions the target of pointing device (cursor), within the graphical region of the actuator causing a "rollover" event to occur.
3. In superior software, the cursor changes shape to reinforce the operator's assumption that the graphical object under the cursor is indeed an actuator. Also in superior software, this "rollover" event causes additional text or graphic information to be displayed, typically on or around the actuator.
4. The operator presses a button (mouse down event) on the pointing device to indicate they want to activate the actuator. If a button were activated without the operator pressing the button, it would typically be considered a "bug".
5. The actuator either actuates immediately, or, in superior software, changes appearance to indicate that the operator has pressed the button.
6. In the latter case, if the operator releases the button (mouse up event) while the cursor is still within the actuator, the actuator activates. If the operator moves the cursor out of the actuator's region ok before releasing the button (mouse up event), the actuation is cancelled.

Recent touch-sensitive switches can be activated just by touching them. In both cases the actuation is immediate: a touch-sensitive switch would be regarded as defective if it did not activate immediately on touch.

Touch pads and touch screens on computers substitute a "tapping" action on the part of the operator for pressing the button, but the action is still a positive and deliberate physical one.

Some racing and first person point of view computer games use the cursor to control the direction of navigation. Moving the cursor to the top left of the screen causes the game world to immediately shift to the north-west, for example. Cursor movement from left to right can be used to control the steering wheel of an on-screen race car in a racing game. In such uses a delay between the positioning of the pointer and the turning of the steering wheel would be seen as a defect in the program.

The use of actuators pervades everything in our lives, and extensive work has gone into establishing rules for how actuators should work. Apple Computer's "Human Interface Guidelines" have been instrumental in defining the state of the art in software control. Two quotes here summarize much of the prior art:

"In general, just moving the mouse changes nothing except the location, and possibly the shape, of the pointer. Pressing the mouse button indicates the intention to do something, and releasing the mouse button completes the action."

"Clicking has two components: pushing down on the mouse button and then quickly releasing it while the mouse remains stationary. (If the mouse moves between button down and button up, dragging—not clicking—is what happens.) Some uses of clicking are to select an object, to move an insertion point, to activate a button, and to turn on a control such as a checkbox. The effect of clicking should be immediate and evident. If the function of the click is to cause an action (such as clicking a button), the selection is made when the button is pressed, and the action takes place when the button is released."

But for all the pervasiveness of these actuators, they suffer from serious disadvantages:

1. Physical effort is required on the part of the operator to press and release a button or to tap on a touch-pad or touch-screen. At the extreme, clicking has been identified as a cause of Carpal Tunnel Syndrome. Handicapped operators are at an additional disadvantage.
2. The use of a click interface for actuators means that the click interface can not be used for other instructions. This is significant given the limited input bandwidth of most computer interfaces: i.e., the keyboard and the one or two-button mouse. The birth of the multi-button mouse can be seen as evidence of this need.
3. The physical task of clicking the button can unwittingly move the pointing device and cause the cursor to move out of the actuator's region. It is instructional to watch a 4-year-old learn to use a mouse: they carefully position the mouse over the object they want to click on. They then move their little hand to the big mouse button. By the time they nudge the button down, they have moved the mouse and pushed the cursor off of the object they are trying to click! Even given the coordination of an adult, this conflict inherent in the design of the current majority of popular pointing devices limits the accuracy of mouse clicks and hence increases the minimum size of the actuator's region.
4. Since the user must press down on a button and then release it, it makes sense for the software to be designed in such a way as to make the onscreen actions correspond to the physical actions. For this reason, many on-screen buttons appear to "press down" when the mouse is pressed down on them. This adds an extra layer of complexity to the interface, and restricts the freedom of the designers from making actuators that more accurately model their true function and are more suggestive of the actuator's result.

5. There is an inherent conflict between the good software design goal of providing feedback for all operator actions and between the goal of a clean simple interface. Feedback for the mouse down and mouse up events, the rollover of the actuator, and for the actuation itself is becomes more significant than the task at hand, i.e., actuation. Current actuator designers must make the unfortunate choice between either providing insufficient feedback for the operator's action or overloading the operator's senses by providing good feedback but thus distracting him or her from other more useful tasks such as anticipating the actuation results or gathering last minute information about the current state prior to actuation.

DEFINITION OF OPT-OUT

Definition: to "opt-out" of something is to choose not to allow it to happen.

Definition: "opt-out time interval", or "opt-out period" is the amount of time during which the operator can choose not to allow actuation.

Definition: "opting-out" audio, visual, tactile or other sensory feedback" is feedback delivered to the operator when the operator chooses not to allow (opts out of) the actuation after having started the opt-out period.

The following excellent definition of "opt-out" is published at http://www.marketingterms.com/dictionary/opt out/:

(1) type of program that assumes inclusion unless stated otherwise.

(2) to remove oneself from an opt-out program.

Additionally, the online dictionary: http://www-dictionary.com/search?q=opt+out&r=3 describes it as follows:

Phrasal Verb:
opt out Slang

To choose not to participate in something: "give individual schools the right to opt out of the local educational authority" (Newsweek).

It has become common for commercial interests to send a single email message, typically containing advertisements or promotional material, to thousands of recipients who have been placed on a mailing list often without their consent. The mailing list is termed an "opt-out" mailing list if the recipients have some way of removing themselves from the list even though they may not have had any choice about their being placed on the list. This kind of a list is popular for the distributors of the email since it takes effort on the part of the user to get out of the list. In contrast, an opt-in list requires that the recipients initially request that they be added to the list.

The term "opt-out" has been borrowed for the title of this invention to emphasize a feature of this actuator. Most actuator's require clear and positive action on the part of the operator to initiate their action. Such actuators might reasonably be characterized as "opt-in" because the operator must make take definitive action to fire them. This actuator could be correctly described as "opt-in" as well, since the operator does have to take positive action to fire it. However, it is surprisingly easily to cock this actuator, and once cocked, it takes more effort to avoid firing it than it takes to let it fire. Hence the term "opt-out" is used as an exaggerated statement about the difference between this and other actuators which, having more pronounced opt-in steps, do not feel obligated to provide an opt-out option.

BRIEF SUMMARY OF INVENTION

Opt-out actuators signal their intention to activate, pause for a moment, and then in the absence of a negative (opt-out) signal from the operator to the contrary, activate.

In software, this is implemented as follows. The first three steps are as above:

1. An actuator region exists on the screen, as above.
2. The operator positions the pointing device, typically a mouse, within the graphical region of the actuator causing a "rollover" event to occur, as above.
3. The cursor changes shape to confirm the operator's assumption or inform the operator that the graphical region which contains the target of the pointing device is indeed an actuator, as above.

But the next steps are new and different:

4. If the operator does not move the cursor out of the activator's region within the amount of time it might take to casually pass the cursor over the region of actuation, the actuator is "cocked" but not fired and the operator is given feedback.
5. If, after receiving this feedback, the operator still does not move the cursor out of the activator's region within a short but not insignificant amount of time which is at least as long as would be necessary for the operator to move the cursor out, the activator is activated.

Some of the objects and advantages of this invention include:

1. No effort is required on the part of the operator to activate the actuator other than entering the region of actuation with the pointing device and holding it there. Though some effort is required to opt-out of the activation, i.e., leaving the region of actuation, unlike traditional actuators, this work is "less" than the work required to activate a traditional actuator. In cases where the activation region is entered voluntarily and purposefully, as opposed to accidentally or unknowingly, this opt-out work is also more "deserved", since if the operator is not interested in the actuator, he or she would probably not have entered the region of actuation.
2. These actuators can coexist with other devices that do require and use clicks, thereby increasing the input bandwidth of the software or device. For example, clicking in a particular region of the screen might cause an avatar in an action game to throw a ball at a target in that region while simply choosing not to opt out of an actuator tied to that region might cause the avatar to move towards that part of the screen. Of course, the button could still be programmed cause the actuator to fire, allowing the operator to skip the wait for the timeout period to expire. But alternatively, using opt-out actuators could obviate the need for any mouse buttons. While I might not anticipate high sales of a zero-button mouse, it is possible to imagine their advantages in situations where the maintenance and cost of the mouse was an issue, such as perhaps in a museum exhibit.
3. Since there is no inherent conflict between holding the pointing device still and pressing the button, the accuracy of actuation can be raised and the minimum size of the actuator's region can be decreased.
4. Since pressing a mouse button is not done, there is no intrinsic motivation to make the actuators look and feel like real world buttons which react to the mouse like real world buttons react to fingers, and no need to program and design things around this non-intrinsic model.
5. There is less distraction to the operator as there is no mouse down and mouse up related sensory feedback during the actuation. Since the moment of actuation is often a critical moment, the clearer the operator's plate the better.

DETAILED DESCRIPTION OF THE INVENTION

Figure 1:
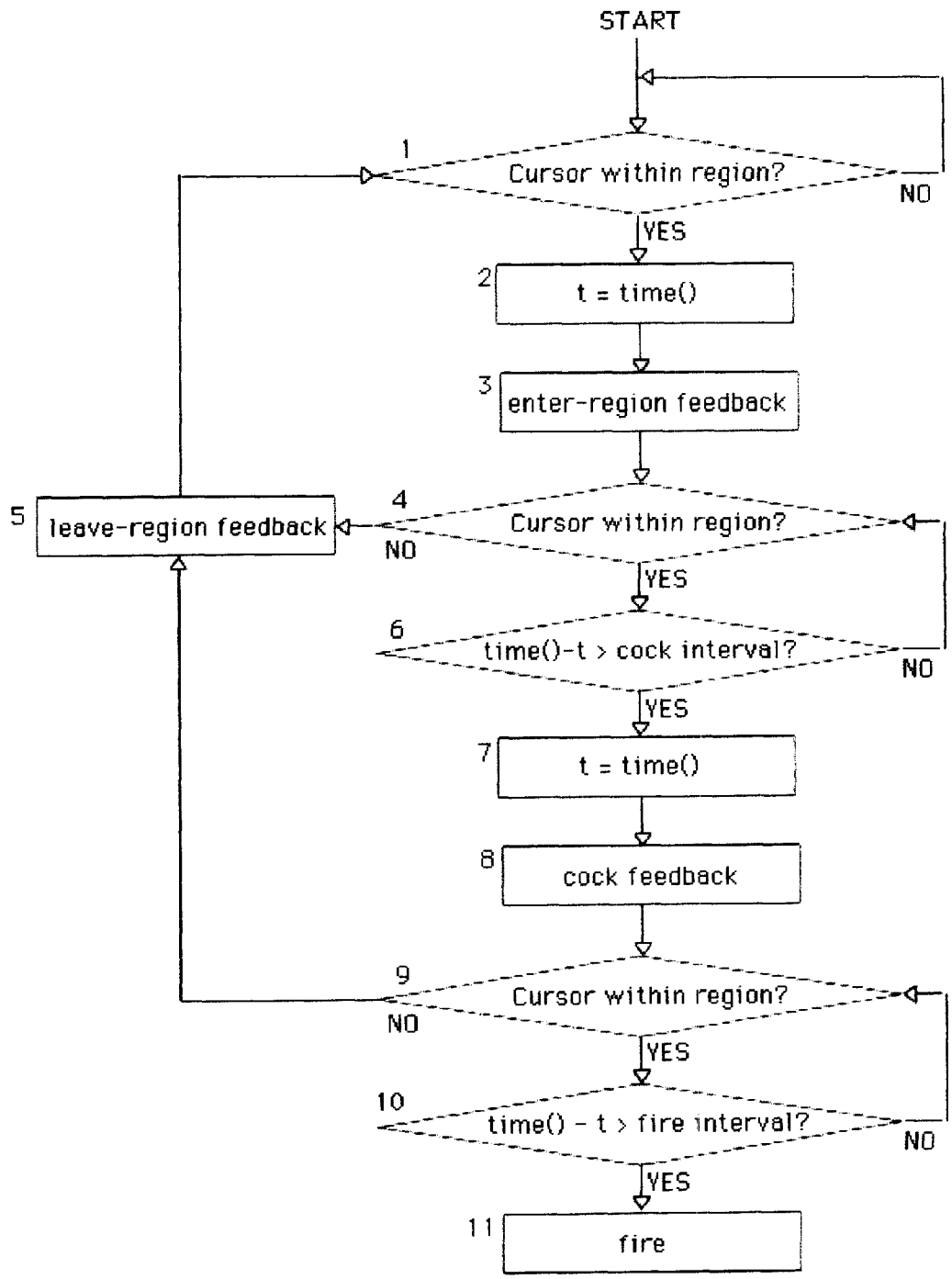
FIG. 1 is a flow chart describing the operation of an opt-out actuator.

One excellent use of the invention is in its application to situations in which there is a pointing device and a screen which contains the target or targets of the pointing device. A visible cursor shows the position of the target of the pointing device. The screen can be divided up into a fixed number of units (pixels if these are also the smallest graphical units) representing the smallest resolution of the pointing device. An example would be a computer screens with 640×480= 307200 pixels, where the pointing device (mouse) can be typically positioned over any of those 307200 pixels. An opt-out actuator is associated with a connected subset of these pixels.

1. The computer maintains a list of the pixels corresponding to the region of the actuator. Additionally, the computer associates with the actuator the following information:
   a. a set of instructions to take when responding to a mouse enter event.
   b. a set of instructions to take when responding to a mouse leave event.
   c. The amount of time required to cock the actuator (grace period). This can be zero or some small amount of time larger only than the amount of time an operator might normally need to pass the cursor over the region of the actuator if they were moving it at a moderate speed to another location, i.e. the "normal passover time".
   d. a set of instructions to take when responding to a cock event.
   e. the amount of time required to fire the actuator (opt-out interval). This must be larger than the amount of time needed for the operator to move the cursor out of the region of actuation. Since different operators might move the pointing device at different speeds, this amount of time should either be the maximum amount of time needed by the normal operators or it could be set to some default value and then means provided to the operator to adjust this setting, similar to the way an operator can adjust the "double-click speed" on most current personal computers.
   f. a set of instructions to take when responding to a fire event.
2. The computer continuously monitors the position of the cursor (FIG. 1, #1).
3. When the cursor moves from a pixel that is not contained in the region of an opt-out actuator to one that is, a "mouse enter" event is triggered.
4. The computer records the time (FIG. 1, #2).
5. The computer performs the instructions (FIG. 1, #3) associated with the mouse enter event and the actuator which include one or preferably more of the following:
   a. A visual change on the screen.
   b. A audio signal.
   c. A change in the appearance of the cursor.
6. The computer continues to monitor the position of the cursor and the difference between the current time and the recorded time (FIG. 1, #4 & #6).
7. If the cursor moves onto a pixel that is not contained in the region of the opt-out actuator before the cock interval is exceeded, a "mouse leave" event is triggered (FIG. 1, #5). The operator has thereby opted out of the actuator. The computer performs the instructions associated with the mouse leave event and the actuator which include one or preferably more of the following
   a. A visual change on the screen, usually back to the state before the region was entered.
   b. An audio signal.
   c. A change in the appearance of the cursor, usually back to the state before the region was entered.
8. If the cursor remains within the connected region of the opt-out actuator until the cock interval is exceeded, a "cock" event occurs.
9. The computer records the time (FIG. 1, #7).
10. The computer performs the instructions (FIG. 1, #8) associated with the cock event and the actuator which include one or preferably more of the following:
    a. A visual change on the screen.
    b. A audio signal.
    c. A change in the appearance of the cursor.
11. The computer continues to monitor the position of the cursor and the difference between the current time and the recorded time (FIG. 1, #9 & #10).
12. If the cursor moves onto a pixel that is not contained in the region of the opt-out actuator before the opt-out interval is exceeded, an "opt-outs event and a "mouse leave" event are both triggered (FIG. 1, #9.1 and #5). The operator has thereby opted out of the actuator. The computer performs the instructions associated with the opt-out event and with the mouse leave event which both include one or preferably more of the following
    a. A visual change on the screen, usually back to the state before the region was entered.
    b. An audio signal.
    c. A change in the appearance of the cursor, usually back to the state before the region was entered.
13. If the cursor remains within the connected region of the opt-out actuator until the fire interval is exceeded, a "fire" event occurs (FIG. 1, #11).
14. The computer performs the instructions associated with the fire event and the actuator which include one or preferably more of the following:
    a. A visual change on the screen.
    b. A audio signal.
    c. A change in the appearance of the cursor, possibly back to the state before the region was entered.

The pointing device need not be a mouse or touch pad. This invention applies equally well laser pointers, sticks, the human finger used in a particular gesture, or any other pointing device for which the target (cursor) can be moved in and out of a specific geographically-based region of actuation.

If a wall mounted video monitor connected to a computer could monitor my eye movements and discern what I was looking at, it might be possible for the sake of argument to define my eyes as the pointing device. But in fact, this would not be appropriate. For one thing, my field of vision is not narrow enough for a computer to be able to tell that I was looking at a particular spot on a screen. Furthermore, when I walk around my house, the light switches should NOT turn on or off if I look at them for more than a small but not insignificant amount of time, because I might really just be staring into space, as I am apt to do. I also do NOT want them giving me little alerts when I start looking at them to wake me up out of my staring into space so that I can look away.

However, if a wall mounted video monitor connected to a computer could monitor my hand and finger movements and discern what I was pointing at with my index finger provided my other fingers were held in a particular configuration, my hand with directed finger could be defined as a pointing device. The requirement that my other fingers be in a particular position would address the problem of the actuation happening when I was gesturing arbitrarily and unintentionally. Suppose that when I pointed my finger in this fashion at a lamp and a small dot of light appeared in a rectangular screen on the base of the lamp. As I moved my finger in a square pattern, the dot might follow my movement. At the bottom, the dot might turn red, indicating power off. The dot would stay red only as long as I was pointing in the actuator's region. If I left the dot in the activator's region for long enough, the actuator would actuate and lamp would turn on. Pointing to the right might activate a motor control to rotate the lamp to the right. Pointing to the bottom might turn it off.

Although the description above contains many specificities, these should not be construed as limiting the scope of the invention but merely providing illustrations of some of the presently preferred embodiments of the invention.

Thus the scope of the invention should be determined by the appended claims and their legal equivalents, rather than by the examples given.

I claim:

1. A method by which an operator can use a pointer unambiguously tell an actuator to actuate itself, said method comprising the following steps:
   a. monitoring the target of the operator's pointer or equivalent operator controlled cursor to determine if it enters a specific geographical region associated with the actuator;
   b. when such intersection occurs, delivering "entering" audio, visual, tactile or other sensory feedback to the operator to indicate that the intersection has occurred and that the cursor is in position to tell the actuator to actuate itself;
   c. monitoring the position of the operator's cursor for a prescribed grace period to determine whether the intersection continues and, if the intersection ends, delivering "leaving" audio, visual, tactile or other sensory feedback to the operator to indicate that the intersection has ended, such feedback consisting of at least the discontinuation of any ongoing entering feedback;
   d. when the intersection is maintained during the entire grace period, delivering "cocking" audio, visual, tactile or other sensory feedback to indicate to the operator the initiation of the opt-out period and therefore the imminence of actuation;
   e. monitoring the location of the operator's cursor for a prescribed "opt-out" time interval to determine whether the intersection continues, and delivering "opting-out" audio, visual, tactile or other sensory feedback to the operator as soon as the intersection ends therefore indicating that the actuation is no longer imminent;
   f. when the intersection is maintained during both the grace period and the opt-out period, actuating the actuator and delivering any "firing" audio, visual, tactile or other sensory feedback to the operator which is necessary or desirable to positively indicate to the operator that actuation has occurred.

2. The method of claim 1 wherein the operator uses a pointing device the target of which appears on a screen as a cursor and the only "intersection" is the positioning of the cursor within the connected sub-region of the screen associated with the device.

3. The method of claim 2 wherein the sensory feedback includes a change in the appearance of the cursor.

4. The method of claim 3 wherein the change in appearance of the cursor in the "entering" feedback is specific to the type of actuator.

5. The method of claim 1 wherein the "cocking" feedback includes an audible warning.

6. The method of claim 1 wherein the "firing" feedback includes an audible confirmation.

7. The method of claim 1 wherein the grace period is zero.

8. The method of claim 1 wherein the grace period is slightly more than the small amount of time for which the region associated with the actuator might be intersected by the operator's cursor during normal operations, as in the case of moving the cursor through the region to get to another region.

9. The method of claim 1 wherein the canceling or opt-out feedback is the reversal of any sensory changes and/or the discontinuation of any continuous sensory feedback from the entering or the cocking feedback respectively and the return to the state of continuous sensory feedback which existed prior to entering.

10. The method of claim 1 wherein the length of the opt-out period can be adjusted prior to use of the actuator based on the operator's preference or skills.

* * * * *